Patented Aug. 30, 1927.

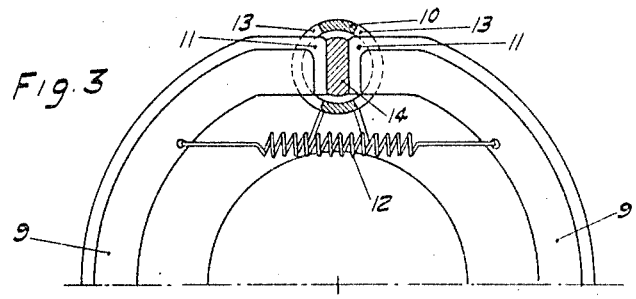
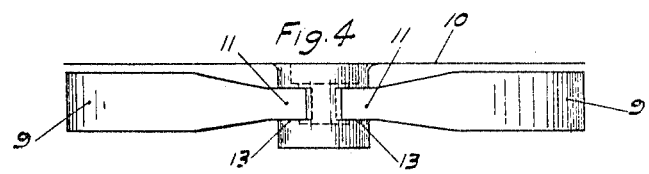
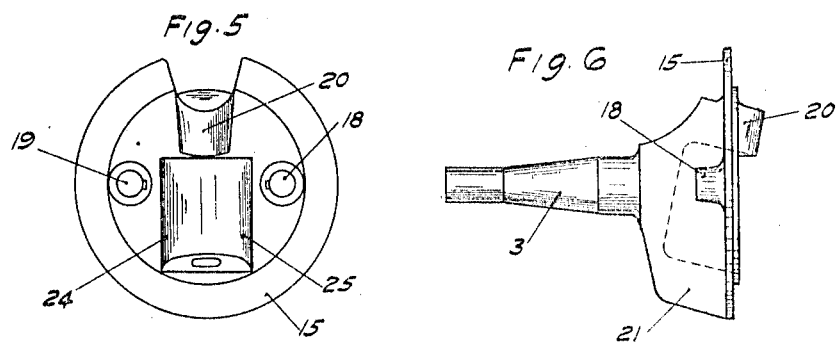
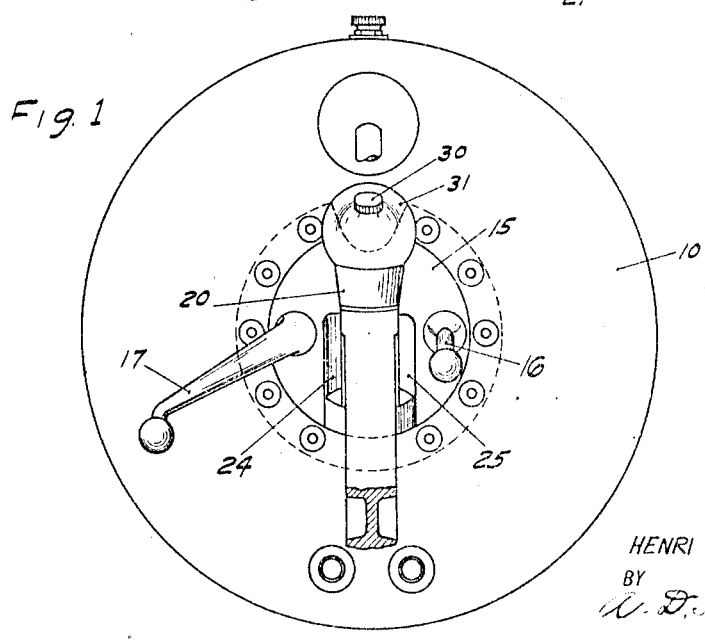

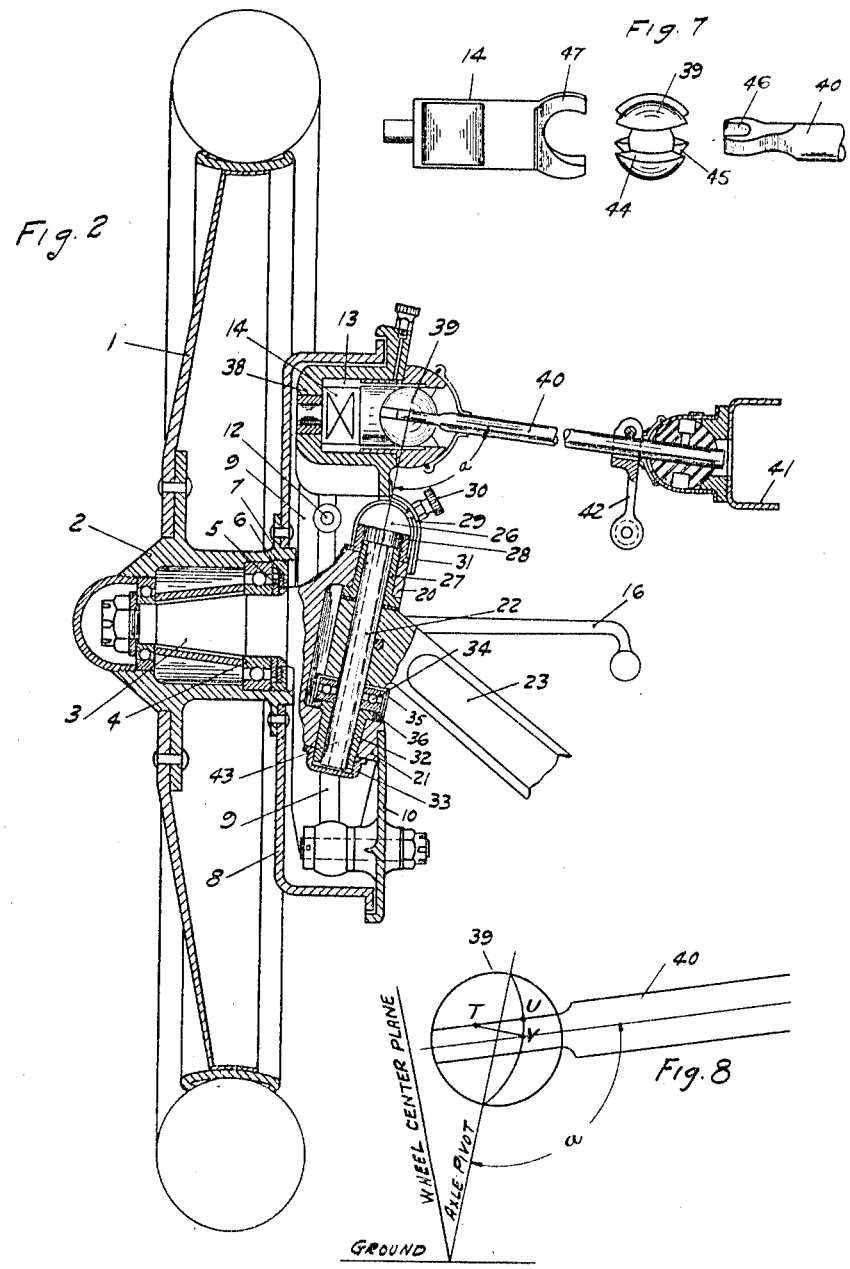

1,640,577

UNITED STATES PATENT OFFICE.

HENRI PERROT, OF PARIS, FRANCE, ASSIGNOR TO BENDIX CORPORATION, OF CHICAGO, ILLINOIS, A CORPORATION OF ILLINOIS.

FRONT-WHEEL BRAKE.

Original application filed August 25, 1922, Serial No. 584,324. Divided and this application filed January 29, 1924. Serial No. 689,219.

This invention relates to improvements in front wheel brakes for motor vehicles and is a division of my application Serial No. 584,324, filed August 25, 1922.

It is the principal object of this present application to provide means or mechanism for applying brakes to the steering wheel of the vehicle, which means or mechanism will be simple in construction and readily applied to the vehicle.

Another object of my invention is to provide a brake control mechanism of such design and so mounted on a vehicle that a differentiating action may be automatically obtained, whereby the brakes are applied with substantially equal force on steering wheels when driving straight ahead and with a less force on the outer wheel than on the inner wheel, when the steering wheels are turned.

A still further object of my invention is to provide brake control mechanism, which can have its main operating parts enclosed, whereby they are protected from water, dirt, dust and other detrimental agents.

These and other objects will be apparent to one skilled in this art after a study of the specification taken in connection with the annexed drawings in which:

Figure 1 is an elevation of the brake as mounted on a wheel.

Figure 2 is a vertical section through the wheel and brake mechanism.

Figure 3 is a section of the brake cam and its support, together with the brake segments.

Figure 4 is a plan view of Fig. 3.

Figure 5 is a side view of the steering spindle.

Figure 6 is a profile view thereof.

Figure 7 is a view of the cam and joint mechanism detached.

Figure 8 is a diagrammatic view to illustrate the differentiating action produced automatically by the steering of the vehicle.

In the various views like numbers refer to corresponding parts. As shown in the drawing, the wheel spindle 3 is provided with a disc 15 stamped or cast integral therewith. This disc is provided with two projections 18 and 19 (Figs. 5 and 6) carrying the levers 16 and 17 (Fig. 1) which serve for steering and for securing the rods connecting both wheels, at the same time, the said disc serves to reinforce the bosses 20 and 21 (Fig. 2) which are the bearings of the spindle 22 of the front axle 23 and it acts also at 24 and 25 (Fig. 5) as a stop piece for the turning of the wheels. The said disc is thus affording several effects which are ordinarily afforded by numerous different pieces. Moreover, it will be noted that the steering spindle is of an absolute symmetric construction, so that it will be used as well for the left as for the right hand wheel, whereby the manufacture is easier and the whole structure much more resistant.

The disc 10 which is the support for the brake segments is secured to the disc 15 while the brake drum 8 is secured to the hub 2. By this disposition the steering spindle is located within the brake and is not seen from the exterior. A cylindrical and hollow boss 38 (Fig. 2) is provided on the disc 10 and contains and supports the brake cam 14. The latter is thus held at both ends on the one hand by the boss 38 and on the other hand by the universal joint 39; at the same time, the said cam is laterally maintained in a position which is determined by the extremities 11 of the brake segments 9 which are always in contact therewith under the action of the segments return spring 12 (Fig. 3). The extremities of the segments are caused to pass through two slits 13 provided in the boss 38 (Fig. 2) in front of the active portion of the cam, said slits having at the same time the purpose of guiding said extremities in a convenient manner. The mounting of this device is rapid while the device itself is resistant and economical. The cam is actuated by the actuating rod 40 joined at one end to said cam by the universal joint 39 and at the other end to the frame 41 of the car by a universal telescopic joint. A lever 42 is keyed on said actuating rod 40 and operated by a pedal which may be actuated by the driver. It will be noted that arm 42 is outside the chassis frame, i. e.

it is between the universal support or joint at the chassis frame member 41 and the universal joint 39. This arrangement, as compared with arranging the arm on the inner end of a shaft passing through the frame, minimizes the weakening of the frame, and simplifies the connections, which may readily be run along the outside of member 41.

The ball member 39 of the universal joint has two annular grooves 44 and 45 at right angles to each other, within which grooves are positioned respectively bifurcated end 46 of the rod 40 and the bifurcated end 47 of the cam member 14. As shown in Fig. 2, the universal joint is mounted in the boss 38 so that at least some part of the joint is in the axial line of the spindle pivot. Furthermore a very important feature of my invention is the positioning of the control rod 40 on the non-rotating part of the vehicle in such a position that the angle between the axis of this control rod and the axis of the steering pivot is different from 90°, i. e. so that the axis of the steering pivot does not coincide with the vertical axis of the universal joint. If this angle be designated as "$a$," when the same is greater than 90°, so that these two axes cross each other in one direction, I have found that the effect on turning the steering wheels is such that the braking force on the outer wheel is decreased, while that on the inner wheel is increased; and if the angle "$a$" is less than 90°, so that the axes cross in the reverse direction, then the braking force is in reverse order from that just described; while if the angle be exactly 90°, with the axes coincident, an equal braking effect should be obtained for all conditions of steering. This will be readily understood by reference to the diagram, Fig. 8, wherein the point T is a given point on the universal joint member 39 along the line of the groove carrying the control rod 40. In turning the wheel the ball 39 revolves about the axle pivot line and the point T is, therefore, moved to the point V. This means that the point V must move upward to the point U, thereby automatically turning the control rod 40; and from the inspection of Fig. 2, when a left-hand turn is made this would be in a direction to assist or augment the pull on the lever 42, thereby increasing braking effect on the inside wheel, while decreasing it on the outside wheel. It will thus be seen that I have provided very simple and ready means for obtaining this differentiating action.

In order to fully understand the action of the brake control mechanism a brief description of the mounting of the wheel to the axle is given as follows:

The steering spindle 22, inclined with respect to the wheel spindle, is shown herein as completely cylindrical and as maintained on the other hand in two symmetric and very long bushings. A ball thrust bearing 34 or a smooth washer bearing supports the efforts which take place between the wheel of the spindle 3 and the front axle 23. This thrust bearing is completely protected from the outside by means of the parts shown, in which a cup 35, made of metal or other material, is secured to one of the parts of the ball thrust, while a tight joint for instance made of cork, is secured to the other part. A cup 35 secured to the one part is covering another similar cup secured to the other part without preventing the rotation of one part with respect to the other, as both cups are adapted to rub slightly on each other along their contact surface. These joints have for their object to insure lubrication of the pivoted members while preventing any oil escape.

The lubrication of the pivot is characterized in that it will be afforded from the exterior without reducing the tightness of the brake which remains complete. A cap 26 (Fig. 2) is pivotally mounted on a special piece 28 secured to the upper bushing 27 of the steering spindle and is provided with a boss 29 supporting the oiler 30. The latter is disposed exteriorly, a cover 31 being arranged between said oiler and the cap 26; said cover 31 closes then the single non-tight part of the brake while providing an excess from the exterior for the oiling. The oil introduced at 30 descends through the axial conduit 43 of the spindle 22 and is stopped at the lower part of the bushing 32 by the plug 33; by this means said oil may only come upwards between the bushings and the spindle 22; a certain portion of oil escapes and lubricates the ball thrust 34 but is thereafter stopped by the joint formed by the cup 35 and the packing 36. It will be seen that there is a constant oil reserve in the pivot.

Lastly, a special mounting of the stuffing box of the hub 2 of the wheel 1 on the spindle 3 prevents any escape of oil towards the brakes and insures a complete security as the wheel cannot be detached from the spindle in case of accident. The stuffing box (Fig. 2) comprises three parts: a ring 7, affording the clamping of the ball bearing 4 from the outside, is screwed on the hub 2 of the wheel 1. A washer 5 is pressed between the bearing 4 and the spindle 3, while a packing 6 made of cork or other like material is disposed between the washer 5 and the ring 7. Said packing 6 having large contact surfaces constitutes a tight joint. If a rupture of the ball bearings should happen the latter do not maintain the wheel any more, but said wheel will be maintained on the spindle 3 as the side cheek of the ring 7 secured to the hub 2 will be retained by the washer 5 secured to the spindle 3. It is to be understood that in the braking system herein described, the arrangement is such that no compensating device between the brake pedal or lever and the operating lever 42 is necessary; furthermore, it is apparent that various changes may be made in the details relating to my present invention, without departing from the spirit of the same and the scope of the appended claims.

Having thus described my invention, what I claim is:

1. In a front wheel for motor vehicles, in combination, a brake drum secured to said wheel, a wheel spindle, a disc provided on said wheel spindle, a steering spindle rotatably mounted on said disc, another disc secured to the said first disc, two brake segments pivotally secured to said second disc at one extremity, a hollow boss on said second disc, two slits provided on said boss, the movable extremities of said brake segments entering said slits, a brake cam in said hollow boss supported by the latter and cooperating with the inner faces of said movable extremities of the brake segments, means for operating said cam, and means connected to said first disc for turning the wheel.

2. Means for operating brakes on a wheel carried by a spindle pivoted to an axle of a vehicle comprising, a brake drum carried by the wheel, a disc on said wheel spindle assisting in carrying the axle pivot, a circular plate secured to said disc and fitting over the opening of the drum and having brake shoes supported thereon, a hollow boss on said plate and having openings in the walls thereof through which the movable extremities of said brake shoes may enter, a cam positioned in said hollow boss and extending into operative relationship with said brake shoes, a shaft having a universal joint connection with said cam at one end and a movable joint support at the other end, and means for actuating the said shaft.

3. Mechanism for differentially controlling brakes on the steering wheels of a vehicle comprising, in combination, a steering pivot between the wheel spindle and vehicle axle, a brake-applying device swivelling with the wheel, a shaft for applying the brakes, a universal joint between the shaft and said device arranged above and substantially in line with the steering pivot and having its vertical axis crossing the axis of the steering pivot to release the brake when on the outside of a turn in the manner described, a chassis frame having a universal support for the opposite end of the shaft, and an operating arm for the shaft arranged between the universal joint and the chassis frame.

4. Mechanism for differentially controlling brakes on the steering wheels of a vehicle comprising, in combination, a steering pivot between the wheel spindle and the vehicle axle, a brake-applying cam and a camshaft swivelling about the pivot with the spindle and wheel, a second shaft normally generally coaxial with respect to the camshaft, a universal joint connecting the camshaft and the second shaft and arranged above and substantially in line with the steering pivot and with its vertical axis crossing the axis of the steering pivot to release the brake when on the outside of a turn in the manner described, a chassis frame having a universal support for the inner end of the second shaft, and an operating arm for the second shaft arranged between the universal joint and the chassis frame.

5. Mechanism for controlling brakes on the steering wheels of a vehicle comprising, in combination, a steering pivot between the wheel spindle and vehicle axle, a chassis frame member, a brake-applying device swivelling with the wheel, a shaft for applying the brakes, a universal joint substantially in line with the steering pivot and connecting the device and said shaft, a universally-movable support for the shaft mounted on the chassis frame member, and an operating arm for the shaft arranged between the support and the universal joint.

6. Mechanism for operating a front wheel brake comprising, in combination, a steering pivot between the wheel spindle and the vehicle axle, a fixed support swivelling with the wheel spindle, a brake-applying cam having supporting shaft portions at both ends which are journalled in said support, and operating means including a universal joint connected to the cam through one of said portions substantially in the axis of the steering pivot.

7. Mechanism for operating a front wheel brake comprising, in combination, a steering pivot between the wheel spindle and the vehicle axle, a fixed support swivelling with the wheel spindle, a brake-applying cam having supporting shaft portions at both ends which are journalled in said support, the inner of said shaft portions terminating in a fork 47, an operating shaft terminating in a fork 46 at right angles to fork 47, and a ball grooved to receive both forks and arranged substantially in the axis of the steering pivot.

8. A brake applying device comprising a cam having integral shaft portions at both ends, one of which terminates in a fork forming part of a universal joint.

9. In a brake, in combination, a brake drum, a support at the open side of the drum, friction means between the support and drum having adjacent separable ends, a hollow boss on the support having openings in its sides into which said ends extend, and brake-expanding means extending axially into the hollow boss and engaging the separable ends.

10. In a brake, in combination, a brake drum, a support at the open side of the drum, friction means between the support and drum having adjacent separable ends, a hollow boss on the support having openings in its sides into which said ends extend, a shaft extending axially into the hollow boss, and a cam on the shaft between and engaging the separable ends.

In testimony whereof, I affix my signature.

HENRI PERROT.